United States Patent Office 3,793,253
Patented Feb. 19, 1974

3,793,253
MIXTURES OF 5-SILAIMIDAZOLIDONES-(2) WHICH CONTAIN ISOCYANATE GROUPS AND URETHANES
Bernd Quiring and Kuno Wagner, Leverkusen, Ingrid Irene Klärchen Gölitz, Cologne, and Walter Noll, Opladen, Germany, assignors to Bayer Aktiengesellschaft, Leverkusen, Germany
No Drawing. Filed Aug. 1, 1972, Ser. No. 277,000
Claims priority, application Germany, Aug. 4, 1971, P 21 38 943.5
Int. Cl. C08g 22/22; C09j 3/00
U.S. Cl. 260—77.5 AT
2 Claims

ABSTRACT OF THE DISCLOSURE

Mixtures of urethanes and 5-silaimidazolidones-(2) which contain isocyanate groups and a process for the preparation of said mixtures are disclosed. The compositions of the invention are eminently suited as bonding interlayers for siliceous or metallic surfaces which are to be coated with synthetic resins or elastomers.

---

This invention provides new systems which are eminently suitable for use as interlayers for bonding siliceous or metallic surfaces to synthetic resins.

This invention relates to mixtures comprising:

(a) 5 - silaimidazolidones - (2) containing isocyanate groups, having the following formula:

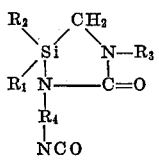

wherein $R_1$ and $R_2$ are the same or different and are optionally halo-substituted or cyano-substituted $C_1$–$C_5$ alkyl, and $C_1$–$C_5$ alkoxy radicals which may be substituted by halogen or cyano-groups or $R_1$ and $R_2$ taken together represent a bis-oxy alkylene group containing 1–3 carbon atoms, $R_3$ is hydrogen, an aliphatic or cycloaliphatic hydrocarbon radical containing up to 15 carbon atoms which may be olefinically unsaturated or an aryl radical containing up to 10 carbon atoms; and $R_4$ is a divalent aliphatic, cycloaliphatic, araliphatic or aromatic radical containing up to 15 carbon atoms which may contain hetero atoms such as oxygen, nitrogen or sulphur or ester groups with (b) urethanes of the general formula:

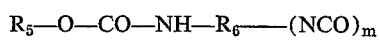

in which $m$ is 0 or 1;

$R_5$ is $C_1$ to $C_5$ alkyl; and $R_6$ is a radical $R_4$ when $m=1$, and when $m=0$, it represents a radical of the following general formula:

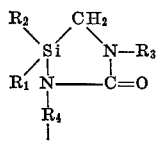

wherein $R_1$, $R_2$, $R_3$ and $R_4$ are as defined hereinabove.

This invention also relates to a process for the preparation of mixtures of (a) 5-silaimidazolidones-(2) containing isocyanate groups and (b) urethanes wherein an aminomethyl alkoxysilane having the following formula:

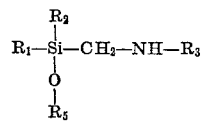

wherein $R_1$, $R_2$, $R_3$ and $R_5$ have the meanings indicated above is reacted with a diisocyanate of the following formula:

wherein $R_4$ has the meaning given above, at temperatures of from about $-20°$ C. to about $+150°$ C. in such proportions that the reaction mixture contains at least one mol of diisocyanate per gram equivalent of primary or secondary amino groups.

The starting materials for the process according to the invention may be any aminomethyl alkoxysilanes of the given formula.

It is preferred, however, to use compounds wherein $R_3$ is a radical containing up to 6 carbon atoms, some examples of which are N-cyclohexyl-(aminomethyl)-ethoxy-dimethylsilane,
N-cyclohexyl-(aminomethyl)-diethoxy-methylsilane,
N-phenyl-(aminomethyl)-triethoxysilane,
N-isobutyl-(aminomethyl)-triisopropoxysilane,
N-cyclohexyl-(aminomethyl)-triethoxysilane,
N-cyclohexyl-(aminomethyl)-diethoxy-tert.-butyloxy-silane,
N-cyclohexyl-(aminomethyl)-ethoxy-ethylene dioxy-silane,
N-vinyl-(aminomethyl)-triethoxysilane,
aminomethyl-trimethoxysilane, and the like.

Aminomethyl-alkoxysilanes which are especially preferred are

N-cyclohexyl-(aminomethyl)-ethoxy-dimethylsilane,
N-cyclohexyl-(aminomethyl)-diethoxy-methylsilane,
N-phenyl-(aminomethyl)-triethoxysilane,
N-isobutyl-(aminomethyl)-triisopropoxysilane,
N-cyclohexyl-(aminomethyl)-triethoxysilane and
N-cyclohexyl-(aminomethyl)-ethoxy-ethylene dioxy-silane.

Any diisocyanates of the given formula may be used for the process according to the invention, some suitable examples of which are:

1,4-tetramethylene diisocyanate;
1,5-pentamethylene diisocyanate;
1,6-hexamethylene diisocyanate;
2,2,4- and 2,4,4-trimethyl-1,6-diisocyanatohexane;
1,11-undecamethylene diisocyanate;
1,12-dodecamethylene diisocyanate;
1,2-diisocyanatocyclobutane;
1,4-diisocyanatocyclohexane;
dicyclohexyl diisocyanate;
dicyclohexylmethane-4,4'-diisocyanate;
p- and m-xylylene diisocyanate;
1-methyl-2,4-diisocyanatocyclohexane;
1-methyl-2,6-diisocyanatocyclohexane;
3-isocyanatomethyl-3,5,5-trimethyl-cyclohexyl isocyanate;
α,ε-diisocyanato-caproic acid esters having 1–8 carbon atoms in the alcohol radical;
tolylene-2,4- and -2,6-diisocyanate;
diphenyl-4,4'-diisocyanate;
di-(4-isocyanatophenyl)-methane;

naphthylene-1,5-diisocyanate;
di-(4-isocyanatophenyl)-oxide;
di-(4-isocyanatophenyl)-sulphide;
2-trichloromethyl-4,6-diisocyanato-s-triazine; and the like.

Especially preferred diisocyanates are 1,6-hexamethylene diisocyanate;
trimethyl-1,6-diisocayanatohexane;
1,4-diisocyanatocyclohexane;
dicyclohexylmethane-4,4'-diisocyanate;
p- and m-xylylene diisocyanate;
methyl diisocyanatocyclohexane;
3-isocyanatomethyl-3,5,5-trimethylcyclohexyl isocyanate;
$\alpha,\epsilon$-diisocyanato caproic acid methyl ester, and
tolylene diisocyanate.

The above mentioned aminomethyl-alkoxysilanes and diisocyanates may be used alone or as respective mixtures in the preparation of the mixtures according to the invention. The aminomethyl alkoxysilanes may also contain, for example, small quantities of silicon-free amines, and the isocayanates used may contain solvents.

The aminomethyl silanes containing alkoxy groups and the diisocyanates are reacted together at temperatures of from about $-20°$ C. to about $+150°$ C., preferably from about $0°$ C. to about $120°$ C., such that an excess of diisocyanate is always present. The reaction is preferably carried out with the exclusion of moisture. For example, the liquid aminoalkyl-alkoxysilane, if desired, in a solvent which is inert to both reactants, such as for example, benzene, toluene, xylene, chlorobenzene, o-dichlorobenzene and the like, is added dropwise with stirring to the diisocyanate which may, if desired, be preheated and the reaction mixture is kept at the desired temperature by controlling the rate of addition of amine. At least 1 mol of diisocyanate but preferably more than 2 mols, i.e., up to about 20 mols are used for 1 mol of amino groups.

If desired, the reaction may be carried out in the presence of one or more catalysts, preferably tertiary amines such as, for example, triethylamine, pyridine, methyl pyridine, N,N - dimethyl benzylamine, N,N - dimethyl aminocyclohexane, N,N'-dimethyl piperazine, N,N'-endoethylene piperazine and the like; amidines such as, for example, 1,5-diazabicyclo-(0,4,5)-undecene-(5) and the like; or metal salts such as, for example, iron (III) chloride, zinc chloride, tin-(II)-2-ethyl caproate, dibutyl tin (IV)-dilaurate, molybdenum glycolate, zinc-2-ethyl caproate and the like.

If the reaction is carried out at temperatures below $60°$ C., it generally takes several hours to several days before formation of the silaimidazolidone ring is completed.

To remove excess diisocyanate, the reaction mixtures are advantageously subjected to continuous flow or thin layer distillation. Continuous distillation of unreacted starting material is generally carried out at from about $80°$ C. to about $250°$ C., preferably from about $90°$ C. to about $210°$ C., at reduced pressure, preferably at less than about 50 mm. Hg. The conventional continuous flow or falling film evaporators whose mode of operation is described, for example, in German patent specification No. 1,090,196 may be used.

Products containing double bonds which are capable of radical polymerization may be treated with suitable polymerization inhibitors, such as for example, hydroquinone and the like before the thin layer distillation is carried out.

It is sometimes advisable to dissolve the mixture of reaction products and excess diisocyanate in a suitable solvent such as, for example, xylene, chlorobenzene, o-dichlorobenzene and the like which acts as vehicle for the diisocyanate in thin layer or continuous flow distillation.

Thin layer distillation may be repeated several times until the distillation residue is substantially free of monomeric diisocyanate.

In cases where the presence of unreacted diisocyanate would not interfere with subsequent intended use of the products, thin layer or continuous flow distillation may be carried out in such a manner that a certain amount of the starting material which has been used in excess is left in the reaction mixture.

If desired, unreacted diisocyanate may also be removed by extraction with suitable solvents such as, for example, cyclohexane, petroleum ether, cleaning petrol or the like.

The mixtures of substances according to the invention are formed from aminomethyl alkoxysilanes and diisocyanates in accordance with the following reaction mechanism:

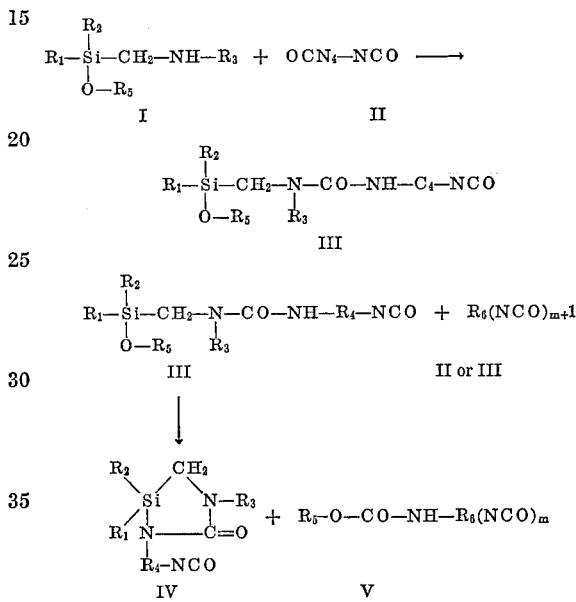

In these formulae, $m$ and $R_1$ to $R_6$ have the meanings already indicated above.

In one particular embodiment of the process, reaction of the aminomethyl-alkoxysilane with diisocyanate is stopped before the ring closing reaction is complete and this is then completed by the effect of the temperature used in the falling film evaporator. This variation, as well as the use of a comparatively small quantity of diisocyanate, is especially advantageous if the mixture of products is required to contain a high proportion of the compound:

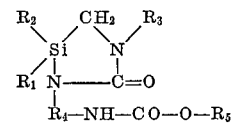

If the ring closing reaction is completed in the falling film evaporator, it is possible under certain conditions, especially if a secondary or tertiary alcohol is split off in the process, partly to distill this alcohol from the reaction mixture instead of reacting it with an isocyanate group.

The mixtures according to the invention obtained by the precess of the invention are mainly 3-component mixtures because Compound III which is formed as intermediate product reacts not only with excess diisocyanate II ($R_6(NCO)_{m+1}$, $R_6=R_4$, $m=1$) but also with itself:

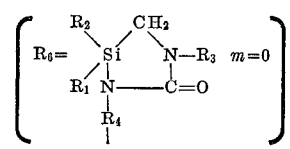

The mixtures according to the invention are thus composed of Compounds IV, VI and VII.

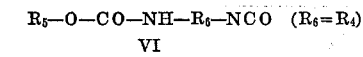

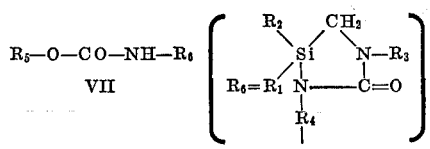

If only one mol of diisocyanate II is used per mol of aminomethyl-alkoxysilane I, the product obtained by the process according to the invention consists almost exclusively of VII. The use of a large excess of diisocyanate results in the preferential formation of mixtures of IV and VI and only a small proportion of VII.

The mixtures according to the invention generally contain about 1 mol of Compound IV, from 0 to about 1 mol of Compound VI and from 0 to about 10 mols, preferably from about 0.01 to about 5 mols of Compound VII.

Although it is already known (see, for example, DOS No. 1,954,447) that aminomethyl-alkoxysilanes react with monoisocyanates to produce substituted ureas which split off alcohol when heated to form 5-silaimidazolidone-(2) rings, it was nevertheless surprising that at the high temperatures encountered during thin layer distillation the simultaneous presence of free isocyanate groups and groups which are reactive with isocyanate groups, for example, groups containing N-H-bonds, do not lead to further addition reactions. Since the ring closing reaction in the process according to the invention proceeds at comparatively low temperatures, it is all the more surprising that even when $R_1$ and/or $R_2$ are alkoxy groups no further intermolecular condensation takes place at the high temperatures of thin layer distillation and with the large excess of isocyanate groups present which act as alcohol acceptors. Both these reactions would lead to an increase in molecular weight, severe reduction in the NCO-content and possibly to cross-linking reactions. Instead, the products obtained by the process have a high NCO-content and an excellent adhesive power which enables them to be bonded to various materials. The proportion of urethane groups to silicon atoms is in no case greater than 1.

The following are given as examples of 5-silaimidazolidones-(2) IV which are obtained in the mixtures according to the invention in admixture with urethanes VI from the diisocyanate (OCN-$R_4$NCO) II used as starting material and the alcohol ($R_5$OH) split off on ring closure and with the corresponding 5 - silaimidazolidones-(2) VII which contain urethane groups:

| 5-silamidazolidones-(2) | Prepared from— |
|---|---|

TABLE—Continued

| 5-silamidazolidones-(2) | Prepared from— |
|---|---|
| (MeO)₂Si ring with CH₂–N(Ar)–C(=O)–N, Ar = phenyl with m-NCO and CH₃ | H₃C–O–Si(OCH₃)₂–CH₂–NH–C₆H₄–H and OCN–C₆H₃(CH₃)–NCO |
| (EtO)₂Si ring with CH₂–N(Ar)–C(=O)–N, Ar = phenyl–CH₂–C₆H₄–NCO | H₅C₂O–Si(OC₂H₅)₂–CH₂–NH–C₆H₄–H and OCN–C₆H₄–CH₂–C₆H₄–NCO |
| (iPrO)₂Si ring with CH₂–N(CH₂CH(CH₃)₂)–C(=O)–N–(CH₂)₄–NCO | (CH₃)₂CH–O–Si[OCH(CH₃)₂]₂–CH₂–NH–CH₂–CH(CH₃)₂ and OCN–(CH₂)₄–NCO |
| (BuO)₂Si ring with CH₂–N(Ar)–C(=O)–N, N substituted with CH₂–CH(CH₃)–CH₂–C(CH₃)₂–CH₂–CH₂–NCO | H₉C₄O–Si(OC₄H₉)₂–CH₂–NH–C₆H₄–H and OCN–CH₂–CH(CH₃)–CH₂–C(CH₃)₂–CH₂–CH₂–NCO |
| (EtO)₂Si ring with CH₂–N(H)–C(=O)–N, N substituted with cyclohexyl-(CH₃)₃ bearing NCO | H₅C₂O–Si(OC₂H₅)₂–CH₂–NH₂ and OCN–CH₂–C₆H(CH₃)₃–NCO |
| Cyclic (OCH₂CH₂O)Si ring fused with CH₂–N(Ar)–C(=O)–N–(CH₂)₆–NCO | (CH₂O)₂Si(OC₂H₅)–CH₂–NH–C₆H₄–H and OCN–(CH₂)₆–NCO |
| (EtO)₂Si ring with CH₂–N(CH=CH₂)–C(=O)–N–(CH₂)₆–NCO | H₅C₂O–Si(OC₂H₅)₂–CH₂–NH–CH=CH₂ and OCN–(CH₂)₆–NCO |

The Si-N-bonds of the 5-silaimidazolidone-(2) rings can easily be split by hydrolysis and alcoholysis to form substituted ureas.

If the product mixtures according to the invention are prepared from pure starting materials they are stable if stored with exclusion of moisture. They are odorless and are generally in the form of highly fluid to moderately viscous liquids which have optimum solubility and working-up properties.

The isocyanate groups of the products according to the invention may be reacted in known manner with the usual blocking agents such as those described e.g. by E. Müller in Houben-Weyl "Methoden der organischen Chemie" XIV, 2, Stuttgart 1963, p. 61 et seq. Suitable blocking agents are, for example, ε-caprolactam, phenol, tert. butanol, butanone-2-oxime and the like. The same compounds which are capable of splitting off isocyanate are also obtained when diisocyanate which has been blocked on only one isocyanate group is reacted with the aminomethyl-alkoxysilane and ring closure is carried out under conditions which favor the splitting off of alcohol, for example, at elevated temperature and under vacuum.

The products may be used as bonding interlayers applied to siliceous or metallic surfaces which are to be coated with synthetic resins or elastomers.

The invention is further described in the following examples, wherein, unless otherwise indicated, the parts and percentages are by weight.

EXAMPLE 1

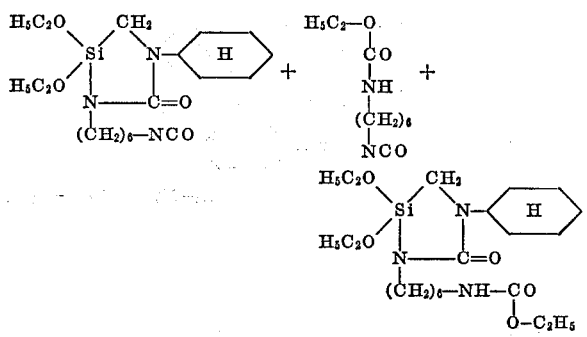

Molar ratio approximately 1:1:0.7.

About 840 parts of hexamethylene diisocyanate are heated to from about 85° C. to about 90° C. with exclusion of moisture in a 1-liter three-necked flask equipped with stirrer, reflux condenser, dropping funnel and thermometer. About 139 parts of N-cyclohexyl-(aminomethyl)-triethoxysilane are added dropwise at this temperature in the course of about 3 hours and stirring is then continued for about another 60 minutes. After cooling, the reaction product is subjected three times to thin layer distillation in a vacuum thin layer evaporator at from about 120° C. to about 125° C. and about 0.1 mm. Hg. A clear, yellow liquid of low viscosity having an NCO-content of about 9.6% and a silicon content of about 5.25% is obtained.

An approximately 5% solution of the product mixture in xylene is applied as a thin layer to a degreased glass plate and left to dry. It is then coated with a 2-component lacquer of commercial triisocyanatohexylbiuret and a polyester of phthalic acid and trimethylolpropane having an OH-content of about 8% which is catalyzed with about 0.2% zinc-2-ethyl caproate on solid carrier. For comparison, the same lacquer is applied in the same thickness to a degreased glass plate. The lacquered plates are dried in air for about 5 days and then stored in distilled water for about 3 days. The coated film can then very easily be stripped intact from the untreated plate but the film applied to the plate which had been pretreated with the product mixture can only be scratched off in small chips with a sharp knife.

EXAMPLE 2

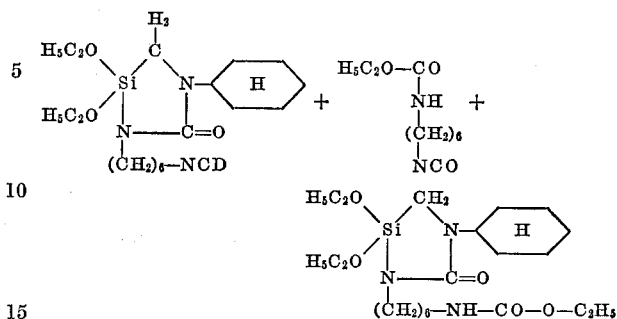

Molar ratio approximately 1:0.3:0.4.

About 139 parts of N-cyclohexyl-(aminomethyl)-triethoxysilane are added dropwise to about 840 parts of hexamethylene diisocyanate at a temperature of about 45° C. in the course of about 2 hours in the apparatus described in Example 1. The reaction mixture is left to cool to room temperature and the mixture of products is purified by thin layer distillation at about 125° C./0.05 mm. Hg. A clear, yellow liquid of low viscosity containing about 5.89% Si, about 8.6% NCO and about 26.0% $OC_2H_5$ is obtained.

EXAMPLE 3

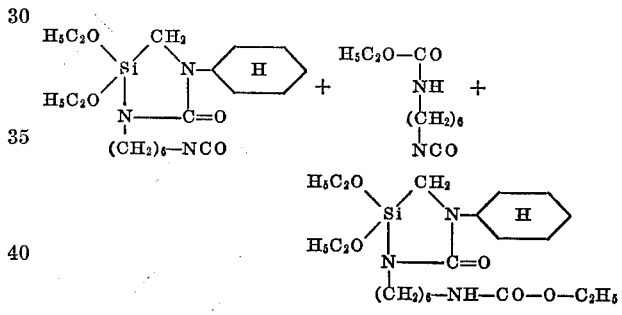

Molar ratio approximately 1:0.0410.8.

About 137.5 parts of N-cyclohexyl-(aminomethyl)-triethoxysilane are added dropwise to about 588 parts of hexamethylene diisocyanate between about 0° C. and about 5° C. in the course of about 100 minutes in the apparatus described in Example 1. As soon as this operation is completed, the product mixture is distilled four times by thin layer distillation at about 130° C./0.07 mm. Hg, the mixture being introduced into the thin layer evaporator from a dropping funnel cooled to about 12° C. to about 14° C. and the distillation sump being cooled to about 0° C. A clear, yellow liquid of low viscosity is obtained which contains about 5.8% NCO and about 6.7% Si.

EXAMPLE 4

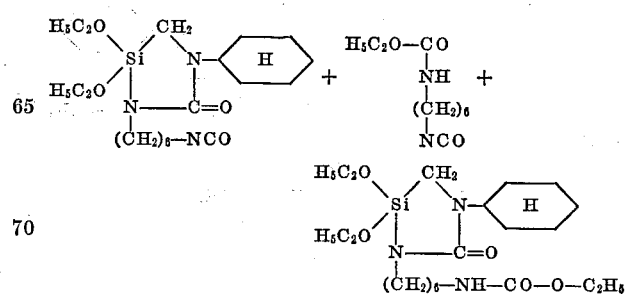

Molar ratio approximately 1:1:1.6.

About 100 parts of N-cyclohexyl-(aminomethyl)-triethoxysilane are added dropwise to about 183 parts of hexamethylene diisocyanate in the course of about 115 minutes at about 0° C. in the apparatus described in Example 1. When this operation is complete, about 100 parts are immediately removed by thin layer distillation at about 120° C./0.06 mm. Hg and the residue is then stirred for about 2 hours at about 120° C. and subjected to thin layer distillation at about 125° C./0.06 mm. Hg until the NCO-content is constant. A clear, yellow liquid containing about 6.7% NCO, about 5.4% silicon and having a viscosity of about 1030 cp. at 20° C. is obtained.

About 82.5 parts of N-cyclohexyl-(aminomethyl)-triethoxysilane are added dropwise to about 400 parts of a commercial mixture of about 2 parts of 2,2,4- and about 1 part of 2,4,4-trimethylhexamethylene diisocyanate at room temperature in the course of about 8 hours with the exclusion of moisture in the apparatus described in Example 1. Stirring is then continued for about 1 hour and the mixture is left to stand for about 6 days (until ring closure is completed). The product is then purified by thin layer distillation at about 125° C. and about 0.05 mm. Hg.

A yellow, clear liquid of low viscosity having an NCO-content of about 8.35% is obtained.

EXAMPLE 5

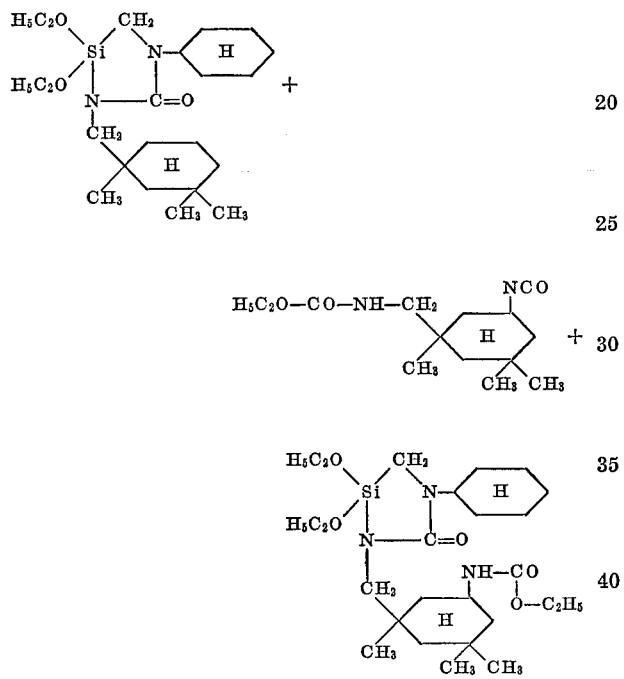

Molar ratio approximately 1:1:0.5.

The procedure is the same as described in Example 1, using about 444 parts of 3-isocyanatomethyl-3,5,5-trimethylcyclohexyl isocyanate and about 110 parts of N-cyclohexyl(aminomethyl)-triethoxysilane. A clear, almost colorless liquid having an NCO-content of about 8.7% is obtained.

EXAMPLE 6

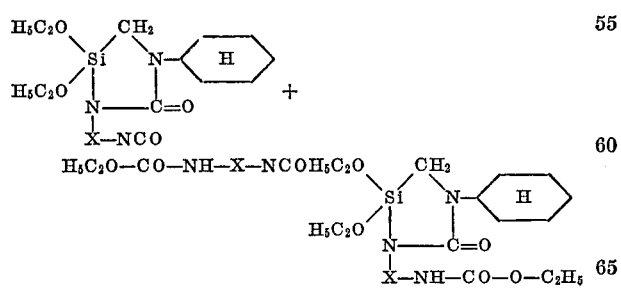

wherein —X— is

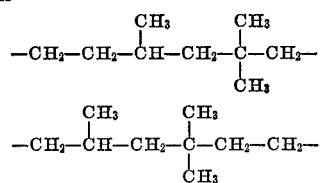

Molar ratio approximately 1:1:0.65.

EXAMPLE 7

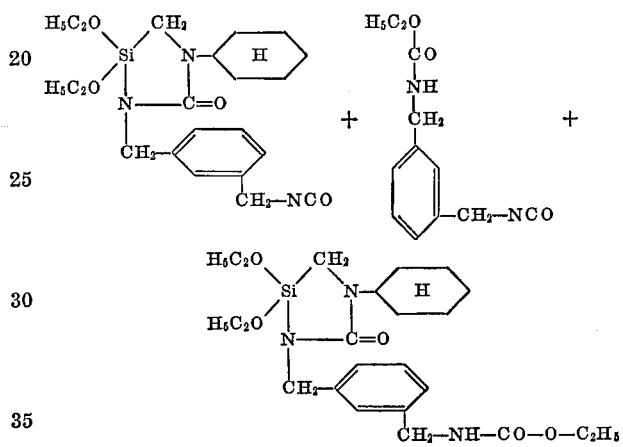

Molar ratio approximately 1:1:0.4.

The procedure is the same as in Example 6, but using about 480 parts of m-xylylene diisocyanate and about 100 parts of N-cyclohexylaminomethylene-triethoxysilane. A clear, yellow liquid of medium viscosity having an NCO-content of about 9.5% is obtained.

EXAMPLE 8

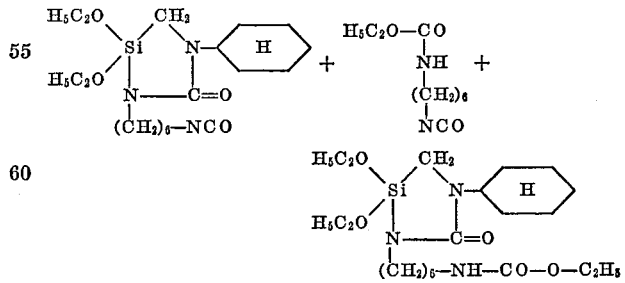

Molar ratio approximately 1:1:1.2.

The procedure is the same as in Example 1, but using about 172 parts of hexamethylene diisocyanate and about 39.4 parts of N-phenyl-(aminomethyl)-triethoxysilane. A clear, yellow liquid of low viscosity having an NCO-content of about 8.0% and a silicon content of about 5.5% is obtained.

EXAMPLE 9

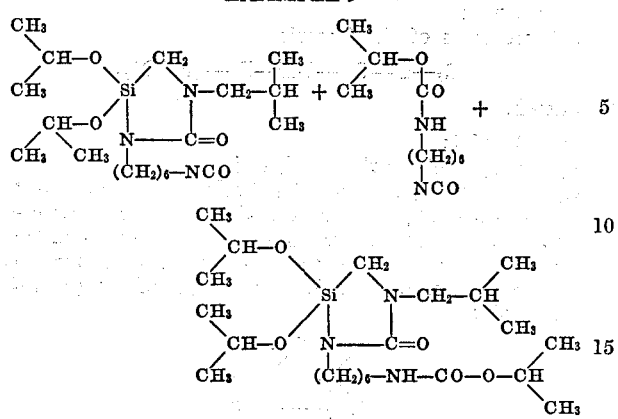

Molar ratio approximately 1:0.15:0.6.

The procedure is the same as in Example 1, but using about 135 parts of hexamethylene-diisocyanate and about 33.3 parts of N - isobutyl-(aminomethyl)-triisopropoxy-silane. A yellow, clear liquid of low viscosity having an NCO-content of about 7.8% is obtained.

EXAMPLE 10

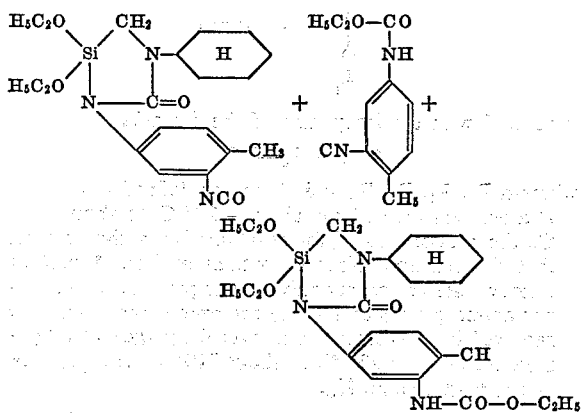

Molar ratio approximately 1:1:0.5.

The procedure is the same as in Example 1, but using about 365 parts of tolylene-2,4-diisocyanate and about 82 parts of N-cyclohexyl-(aminomethyl)-triethoxysilane. A yellow, resinous product having an NCO-content of about 10.4% is obtained after thin layer distillation at about 130° C./0.05 mm. Hg.

EXAMPLE 11

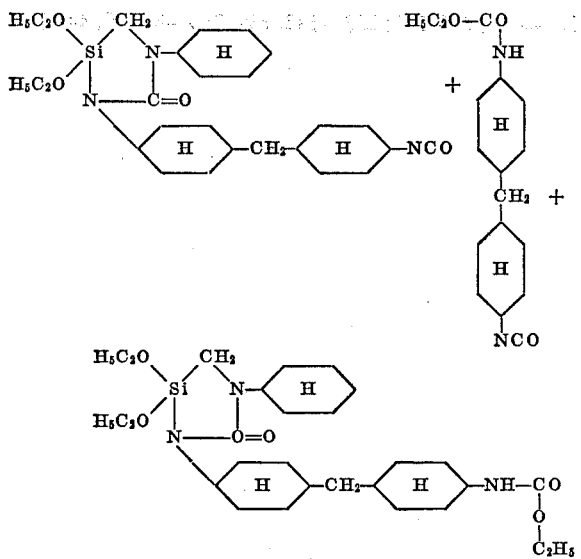

Molar ratio approximately 1:1:0.7.

The procedure is the same as in Example 1, but using about 510 parts of bis-(4-isocyanatocyclohexyl)-methane and about 75 parts of N-cyclohexyl-(aminomethyl)-triethoxysilane. A yellow, clear liquid of low viscosity having an NCO-content of about 7.0% is obtained after thin layer distillation at about 150° C. and 210° C. and 0.05 mm. Hg.

EXAMPLE 12

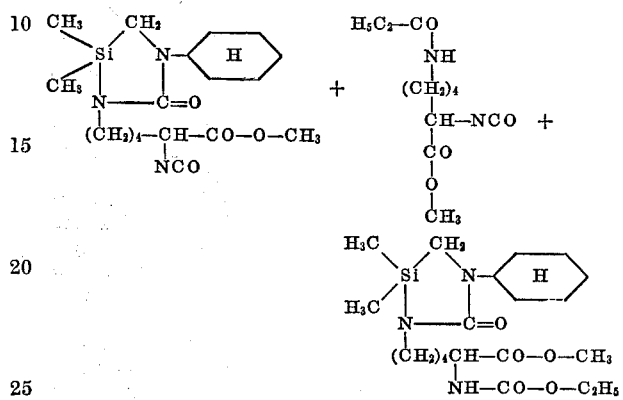

Molar ratio approximately 1:1:0.3.

The procedure is the same as in Example 1, but using about 742 parts of α,ε-diisocyanato caproic acid methyl ester and about 107.5 parts of N - cyclohexyl - (aminomethyl)-ethoxy-dimethylsilane, and a yellow, clear liquid of low viscosity having an NCO-content of about 10.0% and a silicon content of about 4.8% is obtained after thin layer distillation at about 145° C. and 0.05 mm. Hg.

EXAMPLE 13

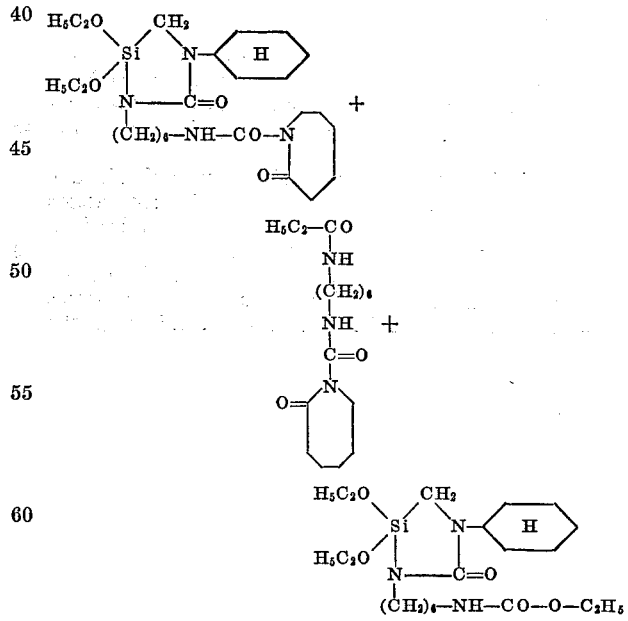

Molar ratio approximately 1:1:0.7.

About 54 parts of caprolactam are dissolved at room temperature with exclusion of moisture in about 200 parts of the product mixture obtained according to Example 1, using a 0.5-liter three-necked flask equipped with stirrer, reflux cooler, thermometer and tube for passing nitrogen over the mixture. The mixture is then stirred at from about 85° C. for about 2½ hours. A clear, yellow liquid which is free from NCO is obtained.

EXAMPLE 14

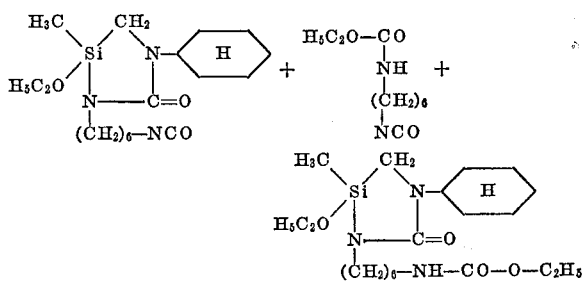

Molar ratio approximately 1:1:0.6.

About 75 parts of N - cyclohexyl - (aminomethyl)-diethoxymethylsilane are added dropwise to about 360 parts of hexamethylene diisocyanate in the course of about 2 hours at about 100° C. in the apparatus described in Example 1 and the reaction mixture is then stirred at the same temperature for about 30 minutes. After thin layer distillation at about 125° C./0.05 mm. Hg, a clear, yellow liquid containing about 10.25% of NCO-groups is obtained.

Although the invention is described in considerable detail in the foregoing examples, it is to be understood that such examples are solely for purposes of illustration and that many variations may be made by those skilled in the art without departing from the spirit and scope of the invention.

What is claimed is:
1. Mixtures comprising:
(a) about one mol of 5-silaimidazolidones-(2) which contain isocyanate groups having the formula:

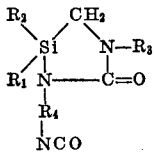

wherein
$R_1$ and $R_2$ are the same or different and are $C_1$–$C_5$ alkyl radicals and $C_1$–$C_5$ alkoxy radicals which may be halo- or cyano substituted, or $R_1$ and $R_2$ together represent a bis-hydroxyalkylene group containing 1 to 3 carbon atoms;
$R_3$ is a hydrogen atom, an aliphatic or cycloaliphatic hydrocarbon radical containing up to 15 carbon atoms which may be olefinically unsaturated or an aryl radical containing up to 10 carbon atoms; and
$R_4$ is a divalent aliphatic, cycloaliphatic, araliphatic or aromatic radical containing up to 15 carbon atoms which may contain hetero-atoms selected from the group consisting of oxygen, sulphur, nitrogen and chlorine; with
(b) urethanes of the formula $$R_5-O-CO-NH-R_6-(NCO)_m$$

wherein $m$ is 0 and 1;
$R_5$ is a $C_1$ to $C_5$ alkyl radical; and
$R_6$ is a radical $R_4$ when $m=1$ and said urethane is present in an amount up to 1 mol, and when $m=0$ said urethane is present in an amount up to about 10 mols with the proviso that each one of the components amount to more than zero mols, $R_6$ is a radical of the general formula:

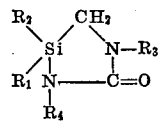

wherein $R_1$, $R_2$, $R_3$ and $R_4$ are as defined hereinabove.

2. A process for the preparation of the mixtures of claim 1 wherein an aminomethyl alkoxysilane of the formula:

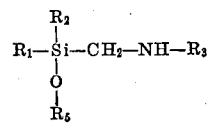

is reacted with a diisocyanate of the formula:

$$OCN-R_4-NCO$$

wherein $R_1$, $R_2$, $R_3$, $R_4$ and $R_5$ are as defined in claim 1 at a temperature of from about −20° C. to about 150° C., the proportions of the reactants being chosen such that the reaction mixture contains at least 1 mol of diisocyanate per gram equivalent of primary or secondary amino groups and where the excess diisocyanate is removed by continuous thin layer distillation at a temperature of from 90° C. to about 210° C. at a pressure of less than 50 mm. Hg.

References Cited

DOS 1,954,447, Noll et al., June 5, 1971. Available on Reel A498/499, Patent Office Search Center.

DONALD E. CZAJA, Primary Examiner

H. S. COCKERAM, Assistant Examiner

U.S. Cl. X.R.

161—190, 206, 213; 252—182, 189; 260—80 NC, 448.2 W

UNITED STATES PATENT OFFICE
CERTIFICATE OF CORRECTION

Patent No. 3,793,253    Dated February 19, 1974

Inventor(s) Bernd Quiring et al.

It is certified that error appears in the above-identified patent and that said Letters Patent are hereby corrected as shown below:

In the heading to the printed specification, line 5, after "Leverkusen," insert -- Hans Dietrich Golitz, deceased, late of Cologne, Germany, by Ingrid Irene Klarchen Golitz, heiress --.

UNITED STATES PATENT OFFICE
CERTIFICATE OF CORRECTION

Patent No. 3,793,253  Dated February 19, 1974

Inventor(s) Bernd Quiring et al.  Page 2 of 5

It is certified that error appears in the above-identified patent and that said Letters Patent are hereby corrected as shown below:

Column 4, line 65, "precess" should read -- process --.

Column 7, line 73, "rnigs" should read -- rings --.

Column 10, line 44, "1:0.0410.8" should read -- 1:0.04:0.8 --.

Column 11, line 73, between the two formulae insert -- and --.

Column 14, line 74, after "85° C." insert -- to about 90° C. --.

Column 4, line 16, formula II, should appear as shown below:

$$OCN-R_4-NCO$$

Formula III, for that portion of the formula reading $-C_4-NCO$   should read   $-R_4-NCO$ Column 5, all the formula under the portion entitled "5-silaimidazolidones-(2)"' that portion of the first formula reading

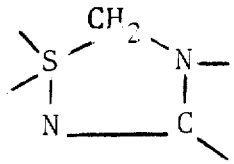   should read   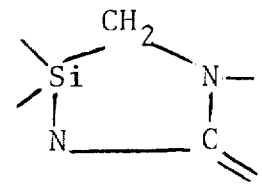

UNITED STATES PATENT OFFICE
CERTIFICATE OF CORRECTION

Patent No. 3,793,253         Dated February 19, 1974

Inventor(s) Bernd Quiring et al.         Page 3 of 5

It is certified that error appears in the above-identified patent and that said Letters Patent are hereby corrected as shown below:

the portion of the second, third, fourth and fifth formulae reading

         should read         

Column 6, the second formula under that portion entitled "Prepared from-" reading

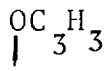         should read         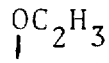

Column 7, the third formula under the portion entitled "5-silamidazolidones-(2)" reading

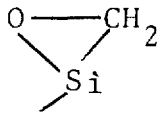         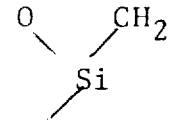

Column 8, the fifth formula under that portion entitled "Prepared from" reading

UNITED STATES PATENT OFFICE
CERTIFICATE OF CORRECTION

Patent No. 3,793,253  Dated February 19, 1974

Inventor(s) Bernd Quiring et al.

Page 4 of 5

It is certified that error appears in the above-identified patent and that said Letters Patent are hereby corrected as shown below:

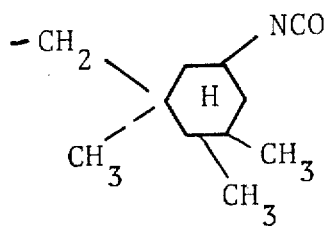  should read  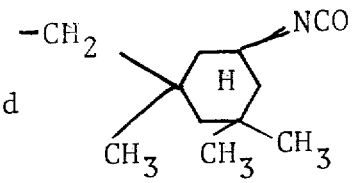

Column 10, Example 2, line 5, that portion of the first formula reading

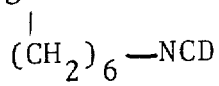  should read  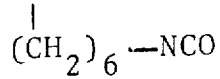

Column 14, Example 12, line 10, that portion of the formula reading

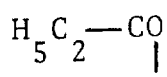  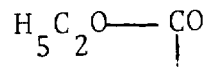

UNITED STATES PATENT OFFICE
CERTIFICATE OF CORRECTION

Patent No. 3,793,253   Dated February 19, 1974

Inventor(s) Bernd Quiring et al.   Page 5 of 5

It is certified that error appears in the above-identified patent and that said Letters Patent are hereby corrected as shown below:

Column 5, the formula under the portion entitled "5-silaimidazolidones-(2)" that portion of the third formula reading

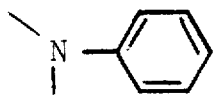   should read   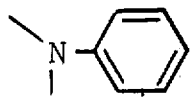

Signed and Sealed this

Fifth Day of October 1976

[SEAL]

Attest:

RUTH C. MASON
Attesting Officer

C. MARSHALL DANN
Commissioner of Patents and Trademarks